United States Patent
Rouleau (10) Patent No.: US 10,008,841 B2
(45) Date of Patent: Jun. 26, 2018

(54) CABLE MOUNTING SYSTEM WITH CABLE EXPANSION COMPENSATION

(71) Applicant: Panduit Corp., Tinley Park, IL (US)

(72) Inventor: Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days. days.

(21) Appl. No.: 15/581,037

(22) Filed: Apr. 28, 2017

(65) Prior Publication Data

US 2017/0317480 A1 Nov. 2, 2017

Related U.S. Application Data

(60) Provisional application No. 62/330,484, filed on May 2, 2016.

(51) Int. Cl.
| | |
|---|---|
| *H02G 3/04* | (2006.01) |
| *H02G 3/32* | (2006.01) |
| *H02G 3/06* | (2006.01) |
| *F16L 3/20* | (2006.01) |
| *F16L 3/22* | (2006.01) |
| *F16L 3/18* | (2006.01) |
| *F16L 3/233* | (2006.01) |

(Continued)

(52) U.S. Cl.
CPC ............ *H02G 3/0456* (2013.01); *F16L 3/137* (2013.01); *F16L 3/18* (2013.01); *F16L 3/20* (2013.01); *F16L 3/221* (2013.01); *F16L 3/233* (2013.01); *F16L 3/26* (2013.01); *H02G 3/0608* (2013.01); *H02G 3/32* (2013.01)

(58) Field of Classification Search
CPC ..... F16L 3/137; F16L 3/18; F16L 3/20; F16L 3/221; F16L 3/233; F16L 3/26; H02G 3/0456; H02G 3/32; H02G 3/0608
USPC .... 248/49, 3, 62, 65, 68.1, 69, 72, 74.1, 58, 248/74.3; 174/68.1
See application file for complete search history.

(56) References Cited

U.S. PATENT DOCUMENTS

| | | | | |
|---|---|---|---|---|
| 3,022,972 A | * | 2/1962 | Bunston ............... | H02G 3/0456 248/68.1 |
| 3,618,882 A | * | 11/1971 | Podedworny ............ | F16L 3/00 248/68.1 |
| 4,510,650 A | | 4/1985 | Espinoza | |

(Continued)

FOREIGN PATENT DOCUMENTS

| | | |
|---|---|---|
| EP | 0047075 A2 | 3/1982 |
| EP | 2571125 A1 | 3/2013 |

(Continued)

*Primary Examiner* — Tan Le
(74) *Attorney, Agent, or Firm* — Christopher S. Clancy; James H. Williams; Aimee E. McVady (57) ABSTRACT

A cable mounting system that allows thermal expansion and contraction of cables. The cable mounting system includes straight ladder rack segments and widened ladder rack segments positioned adjacent the straight ladder rack segments. Cable bracket assemblies are mounted to the straight ladder rack segments and saddle bracket assemblies are mounted to the widened ladder rack segments. The cable bracket assemblies secure cables to the ladder rungs of the straight ladder rack segments and allow axial movement of the cables. The saddle bracket assemblies secure the cables on the ladder rungs of the widened ladder rack segments and allow axial and lateral movement of the cables.

14 Claims, 9 Drawing Sheets

(51) Int. Cl.
*F16L 3/26* (2006.01)
*F16L 3/137* (2006.01)

(56) References Cited

U.S. PATENT DOCUMENTS

| | | | |
|---|---|---|---|
| 5,639,048 A * | 6/1997 | Bartholomew | F16L 3/26 |
| | | | 248/49 |
| 6,129,316 A * | 10/2000 | Bauer | H04Q 1/06 |
| | | | 248/49 |
| 7,312,399 B2 | 12/2007 | Girot | |
| 7,654,492 B2 | 2/2010 | Balderama et al. | |
| 8,398,033 B2 | 3/2013 | Booth | |
| 8,757,560 B2 | 6/2014 | Darnell | |
| 9,106,069 B2 | 8/2015 | Frizzell | |
| 9,270,034 B2 | 2/2016 | Juslin et al. | |
| 9,548,598 B2 * | 1/2017 | Tally | H02G 3/32 |
| 9,587,433 B2 * | 3/2017 | Sylvester | E06C 7/14 |
| 2007/0290100 A1* | 12/2007 | Caveney | H02G 3/0437 |
| | | | 248/74.3 |
| 2011/0315829 A1 | 12/2011 | Darnell | |
| 2013/0047409 A1 | 2/2013 | Booth | |
| 2014/0239131 A1 | 8/2014 | Sylvester et al. | |
| 2014/0325799 A1 | 11/2014 | Frizzell | |
| 2014/0346291 A1 | 11/2014 | Booth | |

FOREIGN PATENT DOCUMENTS

| | | |
|---|---|---|
| FR | 2588426 A1 | 4/1984 |
| GB | 2339237 A | 1/2000 |
| GB | 2389970 A | 12/2003 |
| JP | S57106317 A | 7/1982 |
| JP | S5947214 U | 3/1984 |
| JP | S62129225 U | 8/1984 |
| JP | S62191323 U | 12/1984 |
| JP | H07298445 A | 11/1995 |
| KR | 20050071317 A | 7/2005 |
| WO | 9849484 A1 | 11/1998 |
| WO | 2009142358 A1 | 11/2009 |
| WO | 2015148345 A2 | 10/2015 |
| WO | 2015183672 A1 | 12/2015 |

* cited by examiner

CABLE MOUNTING SYSTEM WITH CABLE EXPANSION COMPENSATION

CROSS REFERENCE TO RELATED APPLICATIONS

This application claims priority to U.S. Provisional Application No. 62/330,484, filed May 2, 2016, the subject matter of which is hereby incorporated by reference in its entirety.

FIELD OF THE INVENTION

The present invention relates to cables secured to a ladder rack, and more particularly to a cable mounting system for ladder racks that enables thermal expansion and contraction of cables secured to the ladder rack.

BACKGROUND OF THE INVENTION

Brackets and straps are typically used to secure cables to ladder racks for short circuit protection or general fastening. A common problem occurs when the cables attached to ladder racks expand or contract. The cables expand or contract at a different rate compared to the ladder rack. The cables move and as a result the connection between the cables and the ladder rack is often broken or damaged. Also, the expansion or contraction of the cables results in relative length changes that will put the cables under compression or tension depending on the direction of the temperature changes. In some situations, the thermal expansion joints of the cable tray will make the problem worse. The relative length differences between the cables and the tray can result in cable distortion, broken rungs, damaged brackets and ladder rack damage.

Therefore, it is desirable to improve the connection of the cables to the ladder racks to allow the cables to expand and contract independently thereby reducing the forces that build within the cables and eliminating damage to the cables and the ladder rack.

SUMMARY OF THE INVENTION

A cable mounting system designed to allow thermal expansion and contraction of cables. The cable mounting system includes straight ladder rack segments and widened ladder rack segments. The straight ladder rack segments have side rails and a plurality of ladder rungs extending between the side rails. The widened ladder rack segments are positioned adjacent at least one of the straight ladder rack segments. The widened ladder rack segments have side rails, angled side rails, and a plurality of ladder rungs extending between the side rails. The angled side rails connect the side rails of adjacent straight ladder rack segments to the side rails of the widened ladder rack segment. The cable mounting system also includes cable bracket assemblies and saddle bracket assemblies. The cable bracket assemblies secure the cables to the ladder rungs of the straight ladder rack segments. The saddle bracket assemblies secure the cables to the ladder rungs of the widened ladder rack segments. The cable bracket assemblies allow axial movement of the cables secured to the ladder rack and the saddle bracket assemblies allow axial and lateral movement of the cables secured to the ladder rack.

DETAILED DESCRIPTION

The present invention is a cable mounting system 20 that allows for thermal expansion and contraction of cables that are attached to a ladder rack. FIGS. 1-4 illustrate the cable mounting system with straight ladder rack segments 22 and a widened ladder rack segment 30. The straight ladder rack segments 22 include side rails 24 and a plurality of ladder rungs 26 extending between the side rails 24. A plurality of cable bracket assemblies 50 secure cables 120 to the ladder rungs 26 in the straight ladder rack segments 22. The cable bracket assemblies 50 allow axial movement of the cables 120.

The widened ladder rack segment 30 includes side rails 32, angled rails 34, and a plurality of ladder rungs 36 extending between the side rails 32. The angled rails 34 connect the side rail 24 of an adjacent straight ladder rack segment 22 with a side rail 32 of the widened ladder rack segments 30. Saddle bracket assemblies 100 secure the cables 120 to the widened ladder rack segment 30. The saddle bracket assemblies 100 allow axial and lateral movement of the cables 120. The cable mounting system 20 allows the cable length differences to travel axially in the straight rack segments 22 and the lateral movement in the widened rack segment 30 collects or delivers the cable length, as required.

Figure 1:
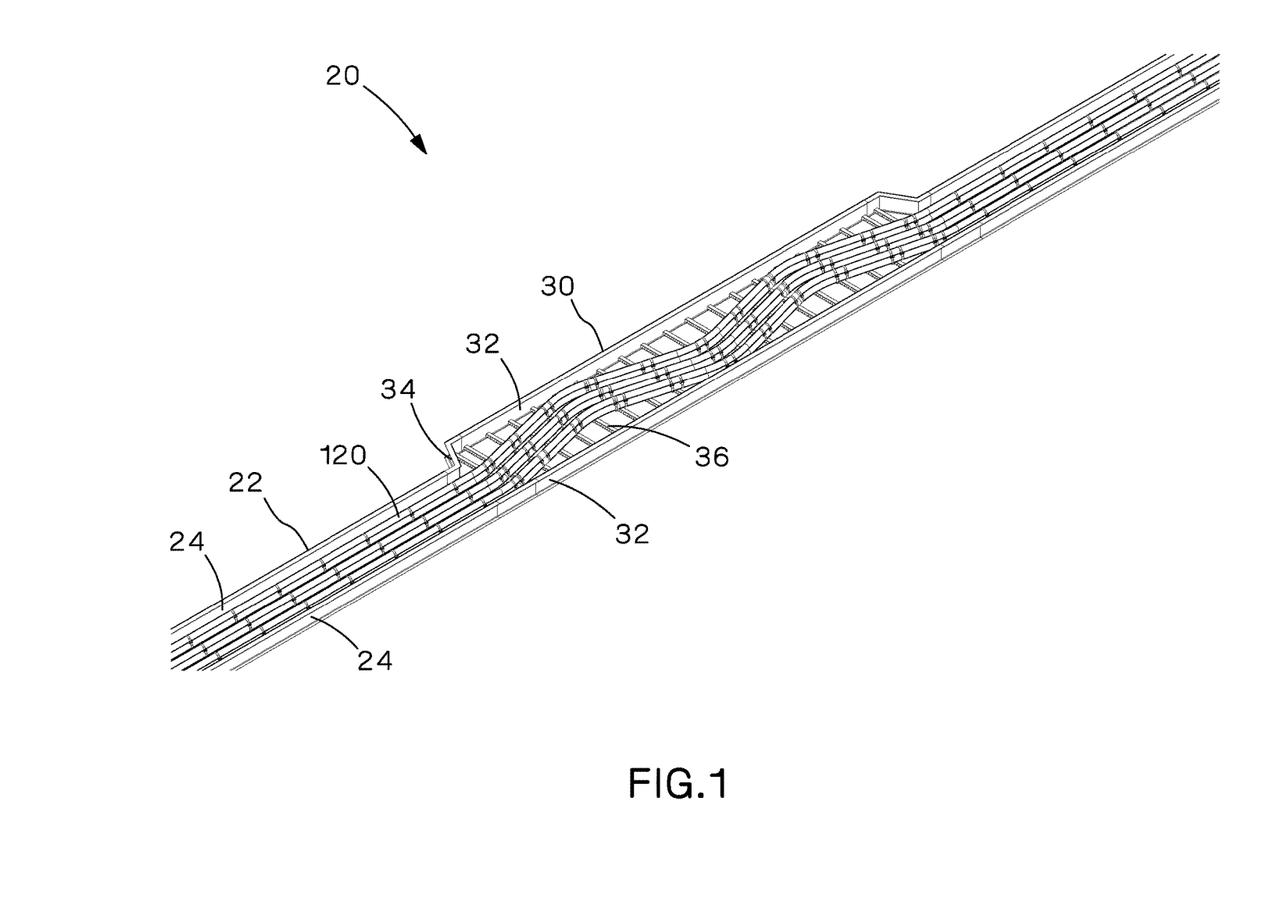
FIG. 1 is a top perspective view of the cable mounting system of the present invention.
Figure 2:
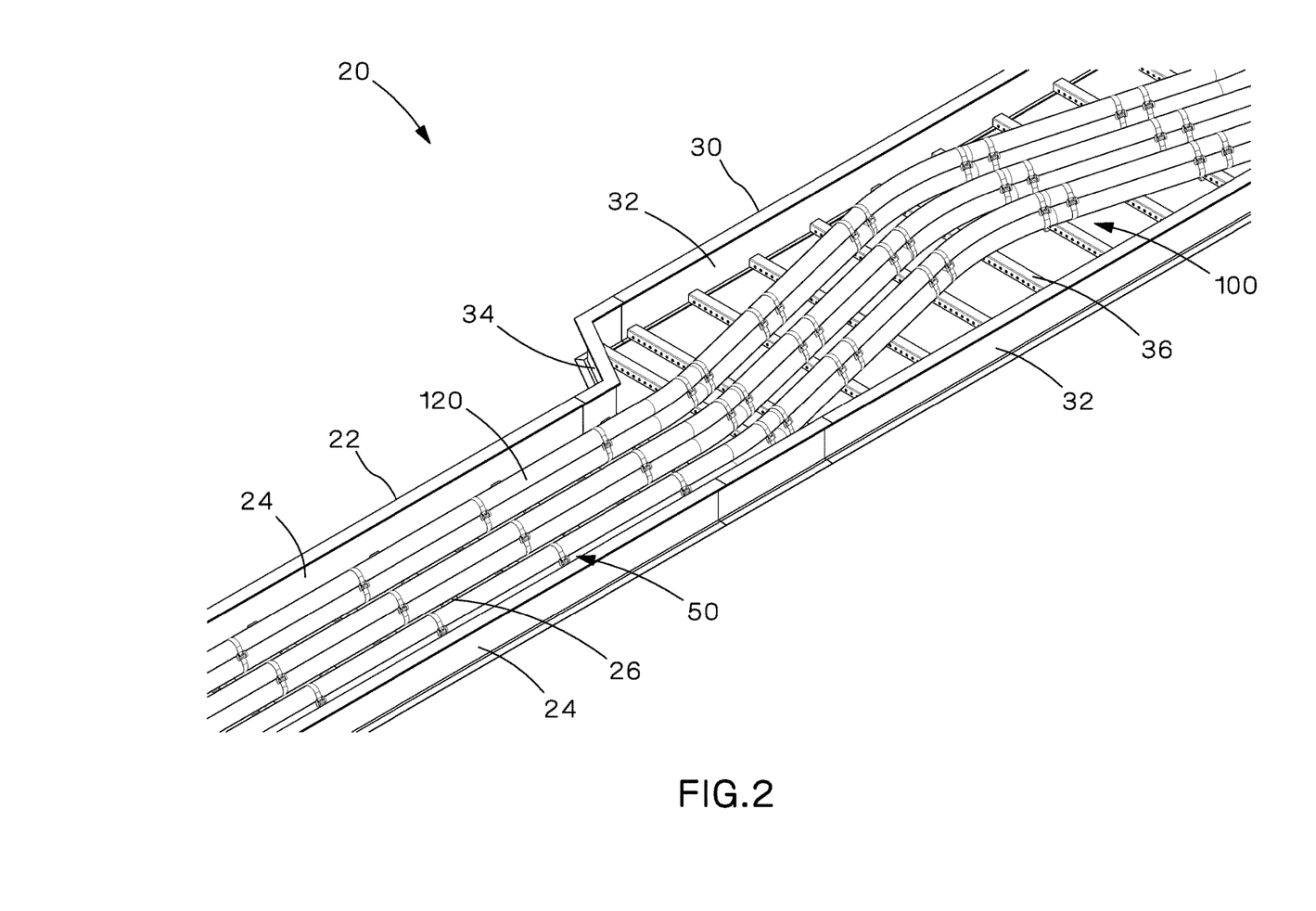
FIG. 2 is a partial top perspective view of the cable mounting system of FIG. 1.
Figure 3:
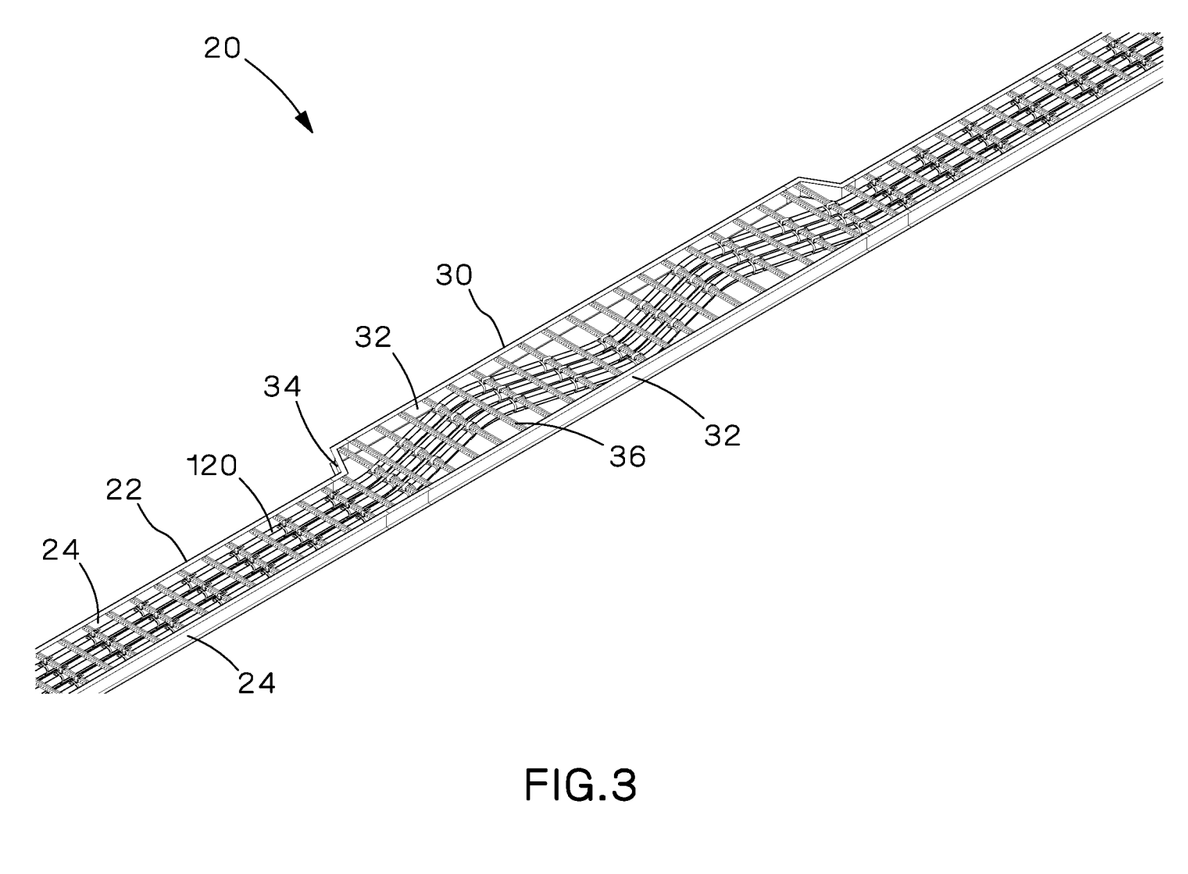
FIG. 3 is a bottom perspective view of the cable mounting system of FIG. 1.
Figure 4:
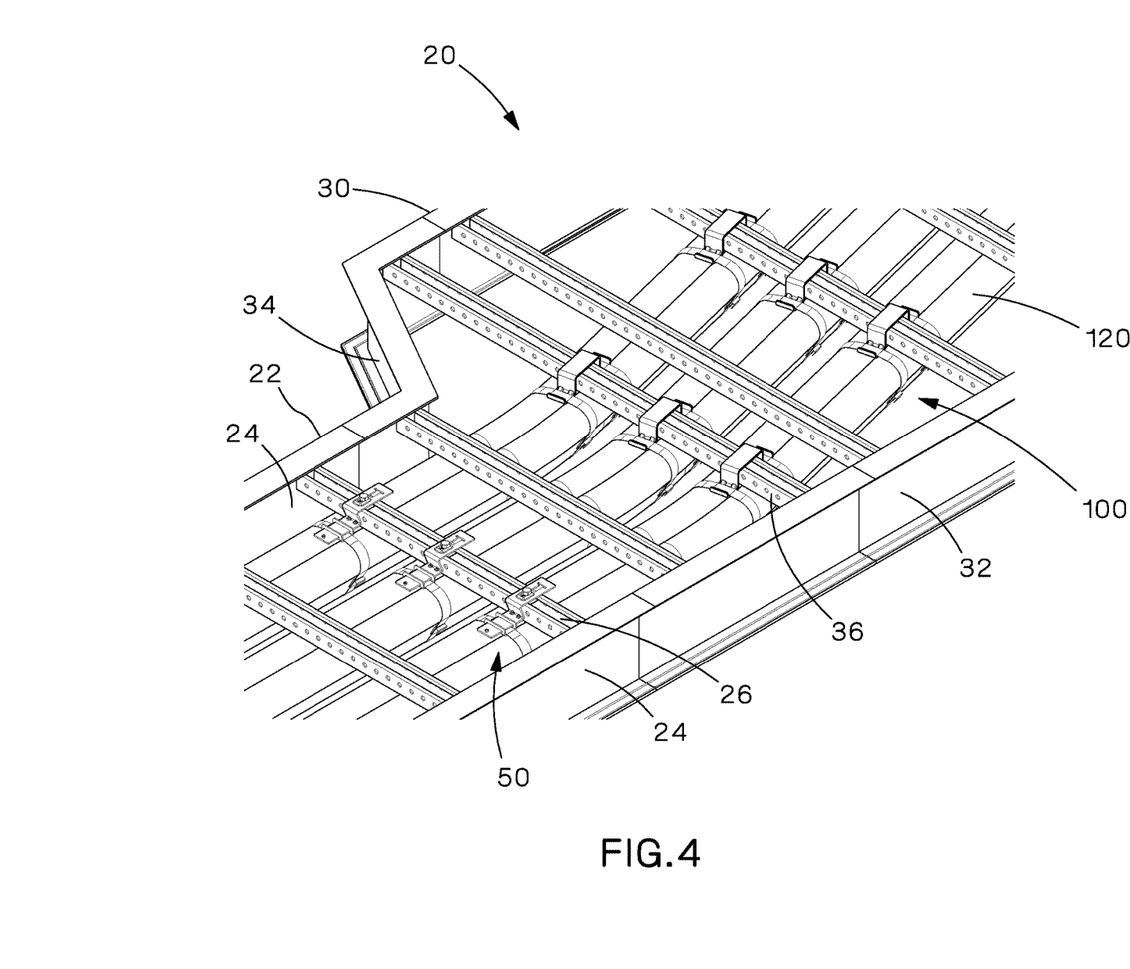
FIG. 4 is a partial bottom perspective view of the cable mounting system of FIG. 3.
Figure 5:
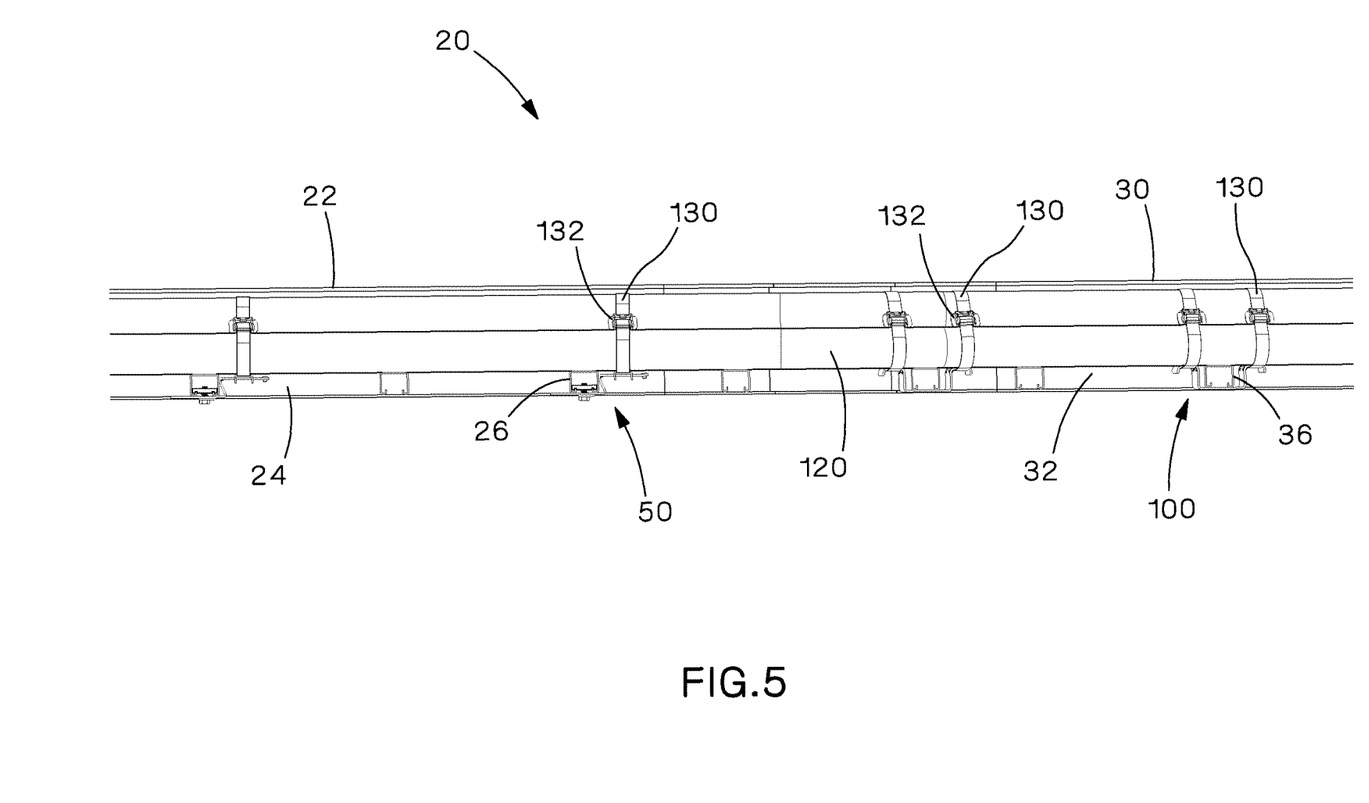
FIG. 5 is a partial side view of the cable bracket assembly and the saddle bracket assembly of the cable mounting system of FIG. 2 with a side rail of the ladder rack removed.

FIG. 5 illustrates a side view of the cable mounting system 20 with cable bracket assemblies 50 securing cables 120 to the straight ladder rack segment 22 and saddle bracket assemblies 100 with pairs of cable straps 130 with a buckle 132 securing the cables 120 to the widened ladder rack segment 30. While cable straps are illustrated, cable ties may also be used to secure the cables to the cable bracket assembly or the saddle bracket assembly.

Figure 6:
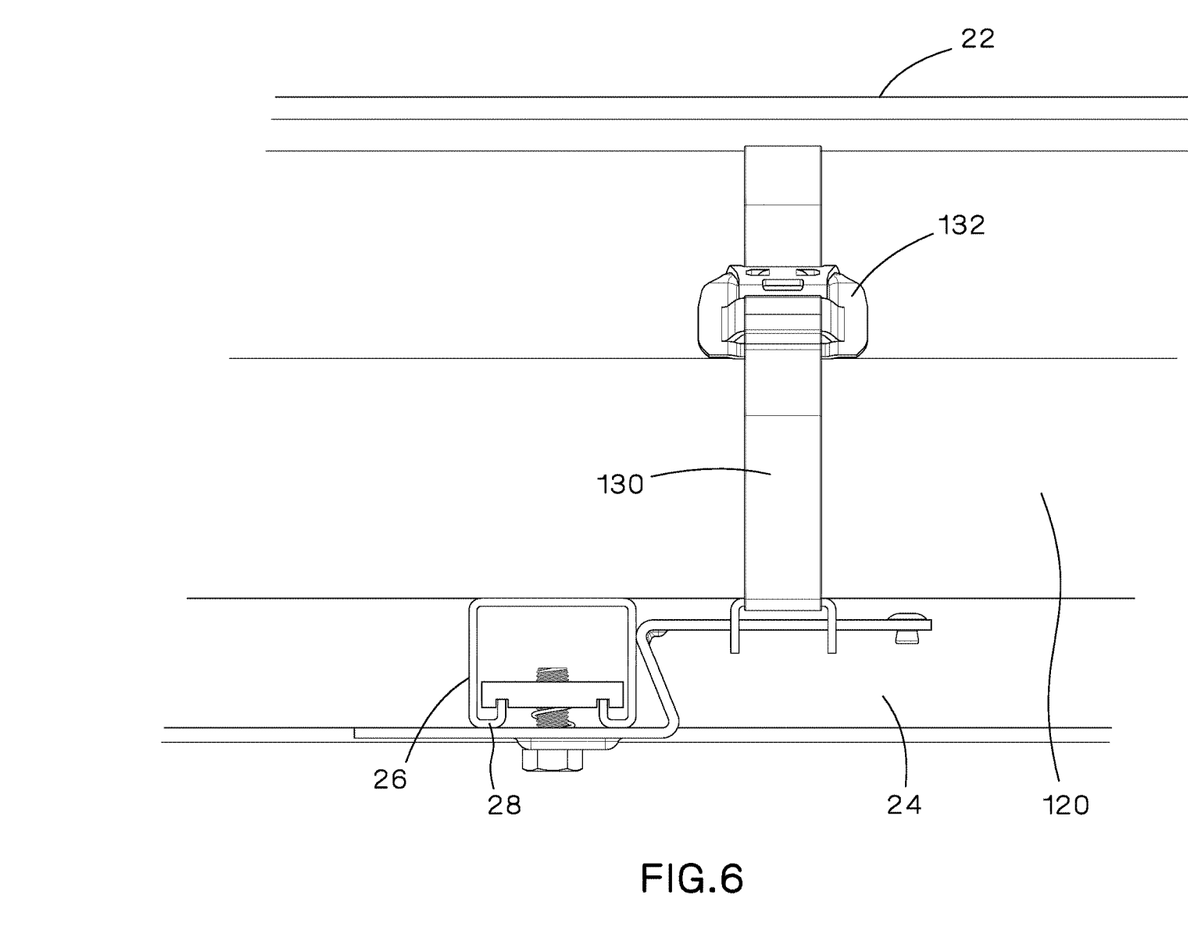
FIG. 6 is a side view of the cable bracket assembly of FIG. 5 securing cables to a ladder rung.
Figure 7:
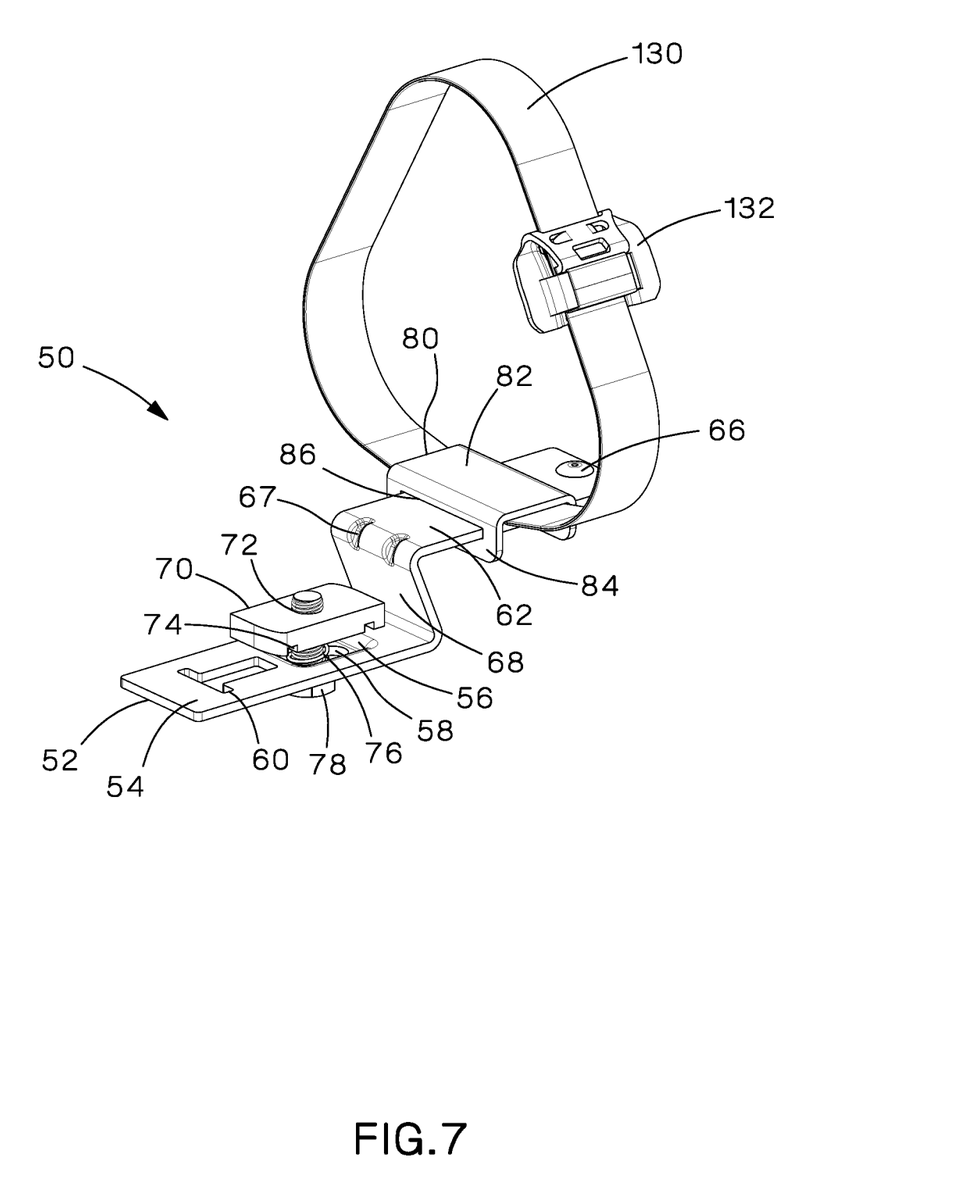
FIG. 7 is a perspective view of the cable bracket assembly of FIG. 6.
Figure 8:
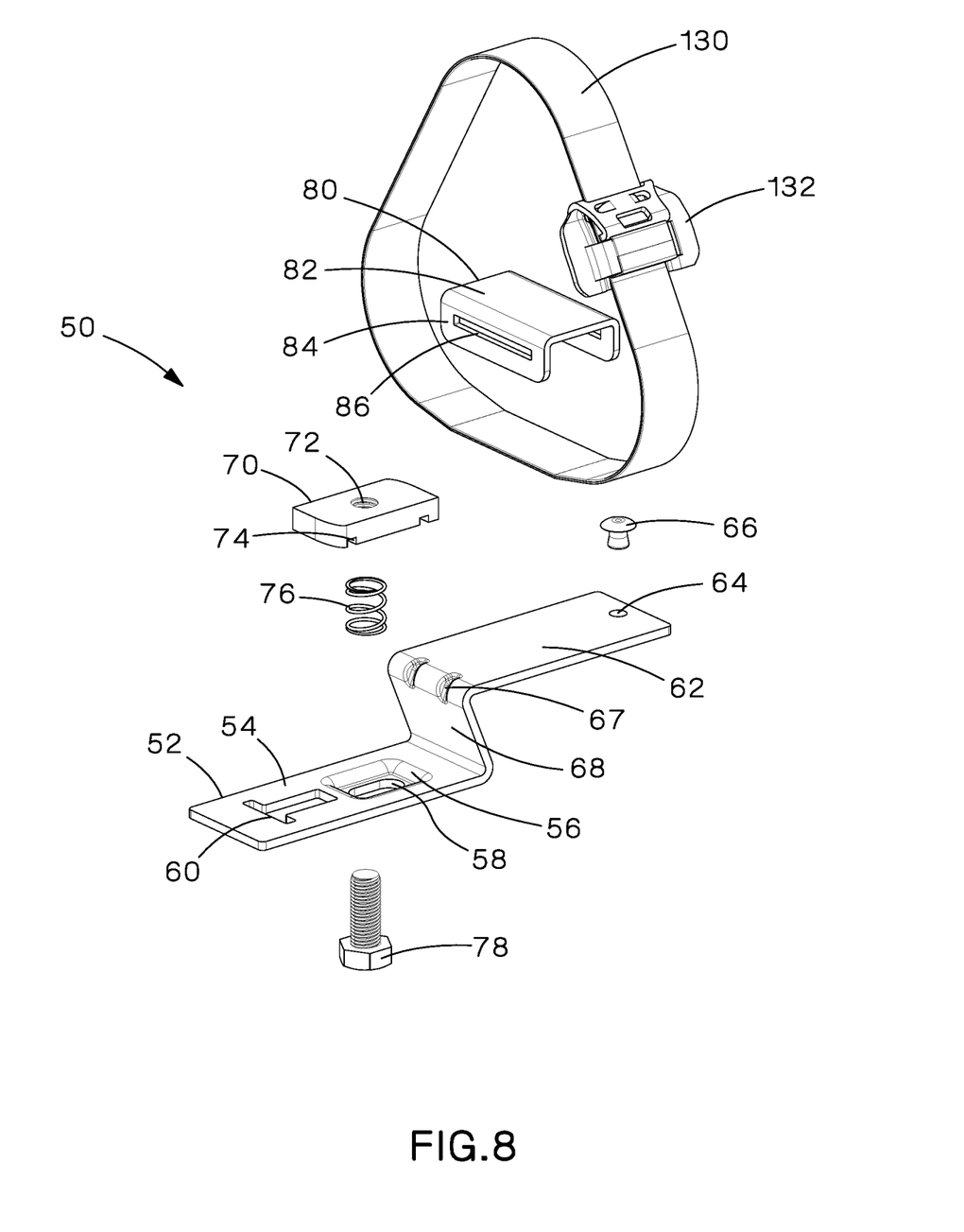
FIG. 8 is an exploded perspective view of the cable bracket assembly of FIG. 7.

FIGS. 6-8 illustrate detailed views of the cable bracket assembly 50. The cable bracket assembly 50 includes a mounting bracket 52, a sliding cable support 80, and a cable strap 130 with a buckle 132. The cable bracket assembly 50 also includes a channel nut 70, a compression spring 76, and a bolt 78.

The mounting bracket 52 is Z-shaped with a bottom member 54, a top member 62 and an angular member 68 joining the bottom member 54 and the top member 62. The mounting bracket 52 also includes gussets 67 between the top member 62 and the angular member 68. The bottom member 54 has a rectangular recess 56 with an oblong cutout 58 in the bottom. The rectangular recess 56 accommodates the compression spring 76, preventing it from over-compression. The channel nut 70 secures the mounting bracket 52 to a strut type ladder rung 26. The oblong cutout 58 accommodates the mounting bolt 78, allowing the mounting bolt 78 to slide to compensate for variations in cable ladder rung widths. The channel nut 70 has a centrally positioned threaded hole 72 and two parallel locating slots 74 on the underside. The threaded hole 72 receives the mounting bolt 78 to secure the channel nut 70. The locating slots 74 rest against the inner flanges 28 of the ladder rung 26 to prevent the channel nut 70 from undesired turning during the tightening of the mounting bolt 78.

The T-shaped cutout 60 provides an alternative means for securing the mounting bracket 52 to a straight ladder rack segment 22 with a ladder rung having different profiles, such as a round rung, a top hat rung, or a beam rung.

The top member 62 of the mounting bracket 52 has a round hole 64 at its distal end. The hole 64 accommodates a stopper 66 for limiting the movement of the sliding cable support 80. As illustrated in FIG. 8, the stopper 66 is a rivet. The stopper 66, however, may be a pin or a screw and nut. Alternatively, the hole 64 may be threaded to accommodate a screw without a nut.

The sliding cable support 80 is a C-shaped channel with a cable support top portion 82 and two downwardly extending side flanges 84. Each side flange 84 has a narrow rectangular slot 86. The rectangular slots 86 receive the top portion 62 of the mounting bracket 52. The sliding cable support 80 slides freely along the top member 62 of the mounting bracket 52 within the limits defined by the angular member 68 of the mounting bracket 52 on one end and the stopper 66 on the other end. A cable strap 130 is routed between the sliding cable support 80 and the top portion 62 of the mounting bracket 52. Cables 120 are positioned on the sliding cable support 80 and the cable strap 130 wraps around the sliding cable support 80 and the cables 120 positioned thereon. As a result, the sliding cable support 80 retains the cable strap 130. Once installed, the sliding cable support 80 moves along the top member 62, as necessary, to compensate for thermal expansion in the cables 120 secured to the ladder rung 26. Thus, the cable bracket assemblies 50 in the straight ladder rack segments 22 enable axial movement of the cables 120 during thermal expansion.

Figure 9:
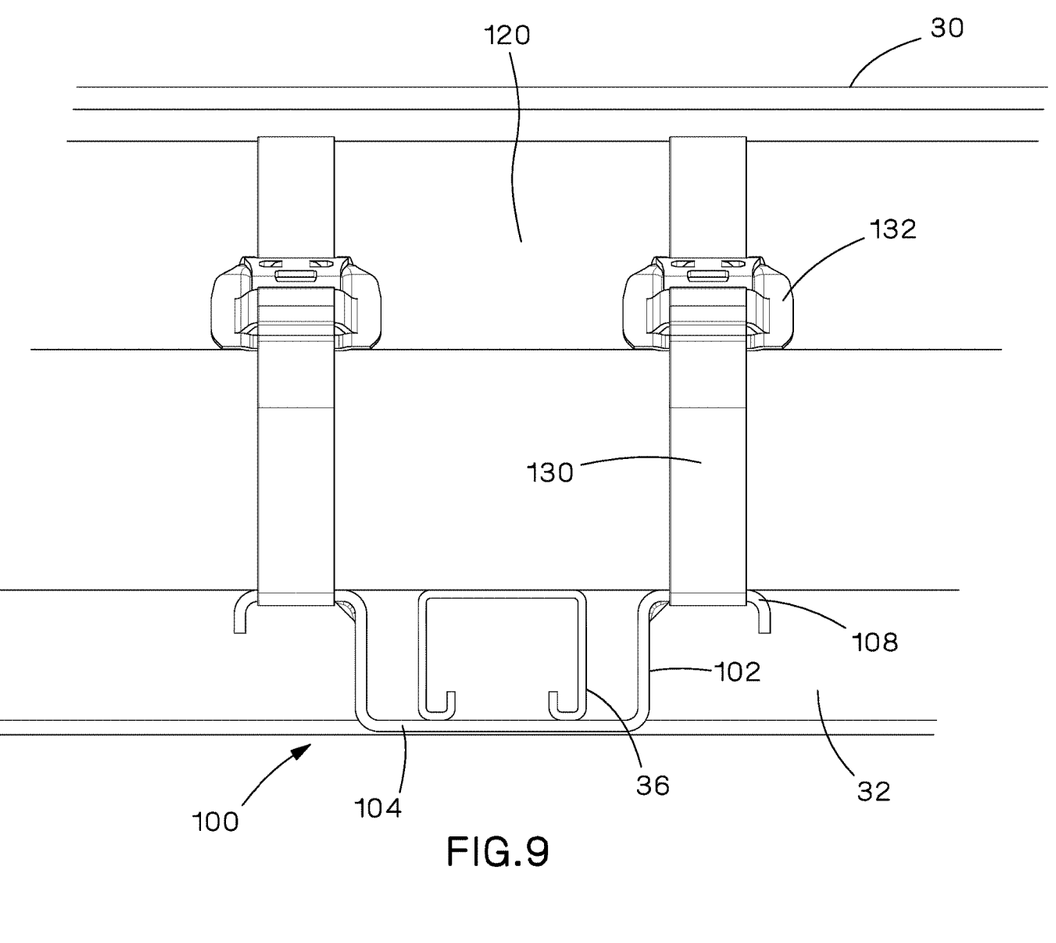
FIG. 9 is a side view of the saddle bracket assembly of FIG. 5 securing cables to a ladder rung.

FIG. 9 illustrates a side view of the saddle bracket assembly 100 with a pair of cable straps 130 with buckles 132 installed on the cables 120. The saddle bracket assembly 100 includes a bracket main body 102 with a lower portion 104 and two upper portions 108. The lower portion 104 accommodates a ladder rung 36. As illustrated in FIG. 9, the lower portion 104 is wider than the ladder rung 36 of the widened ladder rack segment 30 which enables the saddle bracket main body 102 to slide under the ladder rung 36, when necessary, to compensate for cable thermal expansion. The upper portions 108 receive a pair of cable straps 130 to secure the cables 120 to the ladder rung 36 of the widened ladder rack segment 30. Thus, the saddle bracket assembly 100 in the widened ladder rack segment 30 accommodates the lateral movement of the cables 120 during the thermal expansion.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

What is claimed is:

1. A cable mounting system for allowing thermal expansion and contraction of cables, the cable mounting system comprising:
   straight ladder rack segments having side rails and a plurality of ladder rungs extending between the side rails;
   at least one widened ladder rack segment positioned adjacent at least one of the straight ladder rack segments, the at least one widened ladder rack segment having side rails, angled side rails, and a plurality of ladder rungs extending between the side rails, wherein the angled side rails connect the side rails of adjacent straight ladder rack segments to the side rails of the at least one widened ladder rack segment;
   cable bracket assemblies mounted to the straight ladder rack segments, wherein the cable bracket assemblies secure the cables to the ladder rungs of the straight ladder rack segments, wherein each cable bracket assembly comprises a mounting bracket with a bottom member, a top member and an angular member joining the bottom member and the top member; and
   saddle bracket assemblies mounted to the at least one widened ladder rack segment, wherein the saddle bracket assemblies secure the cables on the ladder rungs of the widened ladder rack segments.

2. The cable mounting system of claim 1, wherein the cable bracket assemblies allow axial movement of the cables.

3. The cable mounting system of claim 1, wherein the saddle bracket assemblies allow axial and lateral movement of the cables.

4. The cable mounting system of claim 1, wherein each cable bracket assembly further comprising a sliding cable support engaging the top member of the mounting bracket.

5. The cable mounting system of claim 4, wherein the sliding cable support comprises a top portion and side flanges extending downwardly from the top portion.

6. The cable mounting system of claim 5, wherein the side flanges of the sliding cable support have a rectangular slot, the rectangular slot receives the top portion of the mounting bracket, whereby the sliding cable support slides freely along the top member to compensate for thermal expansion of the cables.

7. The cable mounting system of claim 6, wherein a distal end of the top portion of the mounting bracket includes an opening for receiving a stop member, wherein the stop member limits the movement of the sliding cable support.

8. The cable mounting system of claim 6, wherein a cable strap is routed between the sliding cable support and the top portion of the mounting bracket.

9. The cable mounting system of claim 6, wherein the ladder rung is secured to the bottom member of the mounting bracket and the cables are positioned on the top portion of the sliding cable support.

10. The cable mounting system of claim 9, wherein a cable strap wraps around the sliding cable support and the cables positioned thereon.

11. The cable mounting system of claim 1, wherein each saddle bracket assembly comprises a bracket main body with a lower portion and two upper portions.

12. The cable mounting system of claim 11, wherein the lower portion of the saddle bracket assembly receives one of the ladder rungs of the at least one widened ladder rack segments.

13. The cable mounting system of claim 12, wherein the lower portion of the saddle bracket assembly is wider than the ladder rung of the widened ladder rack segment for enabling the bracket main body to slide under the ladder rung to compensate for cable thermal expansion.

14. The cable mounting system of claim 11, wherein the cables are position on the upper portions of the saddle bracket assembly, and the upper portions receive a pair of cable straps to secure the cables.

\* \* \* \* \*